United States Patent [19]

Kindig et al.

[11] 4,029,184
[45] June 14, 1977

[54] PAWL AND RATCHET CLUTCH

[75] Inventors: Guilford Edwin Kindig, Rochester; Henry Stanislaus Adamski, Webster, both of N.Y.

[73] Assignee: Eastman Kodak Company, Rochester, N.Y.

[22] Filed: Apr. 9, 1976

[21] Appl. No.: 675,102

[52] U.S. Cl. .............................. 192/28; 192/33 R
[51] Int. Cl.² ...................................... F16D 11/06
[58] Field of Search .................... 192/28, 33 R, 148

[56] References Cited

UNITED STATES PATENTS

| | | | |
|---|---|---|---|
| 1,865,048 | 6/1932 | Ringer | 192/28 X |
| 2,858,388 | 10/1958 | Eastman | 192/28 X |
| 3,648,609 | 3/1972 | Ritzerfeld | 101/471 |
| 3,678,827 | 7/1972 | Eagle | 95/10 CD |
| 3,804,626 | 4/1974 | Harvey | 96/76 C |
| 3,810,210 | 5/1974 | Adamski et al. | 354/86 |
| 3,984,852 | 10/1976 | Johnson et al. | 354/217 |

*Primary Examiner*—Allan D. Herrmann
*Attorney, Agent, or Firm*—N. Rushefsky

[57] ABSTRACT

A self-releasing pawl and ratchet clutch is described that is particularly suitable for use as a single revolution clutch in a self-processing camera. At the end of one revolution of the clutch, the pawl is uncoupled from the ratchet wheel by a translatable and pivotable clutch release finger. The finger is spring biased towards a first position and includes a ramp at one end thereof that is locatable in the path of the pawl to stop the pawl from further rotation with the ratchet wheel. In the process of stopping the pawl, the finger is translated from the first position and held by the pawl in a second position against the bias of the spring. After the pawl is unseated from its interdental seat on the ratchet wheel the finger is restored by the spring to the first position. An enlarged tooth formed on the ratchet wheel forces the pawl to be moved generally radially outwardly along the ramp so that the pawl is held away from the tips of the smaller teeth of the ratchet wheel. With the pawl held in this manner there will not be repeated clicking of the tips of these smaller teeth against the disengaged pawl. The pawl is flexible and adapted to automatically disengage from the ratchet wheel in the event the clutch is overloaded. A toothless segment is provided on the ratchet wheel and ensures that the pawl cannot engage the ratchet wheel at a location on the wheel in which the enlarged tooth would be in a position to force the pawl to uncouple from the wheel under loads substantially lower than that desired.

12 Claims, 1 Drawing Figure

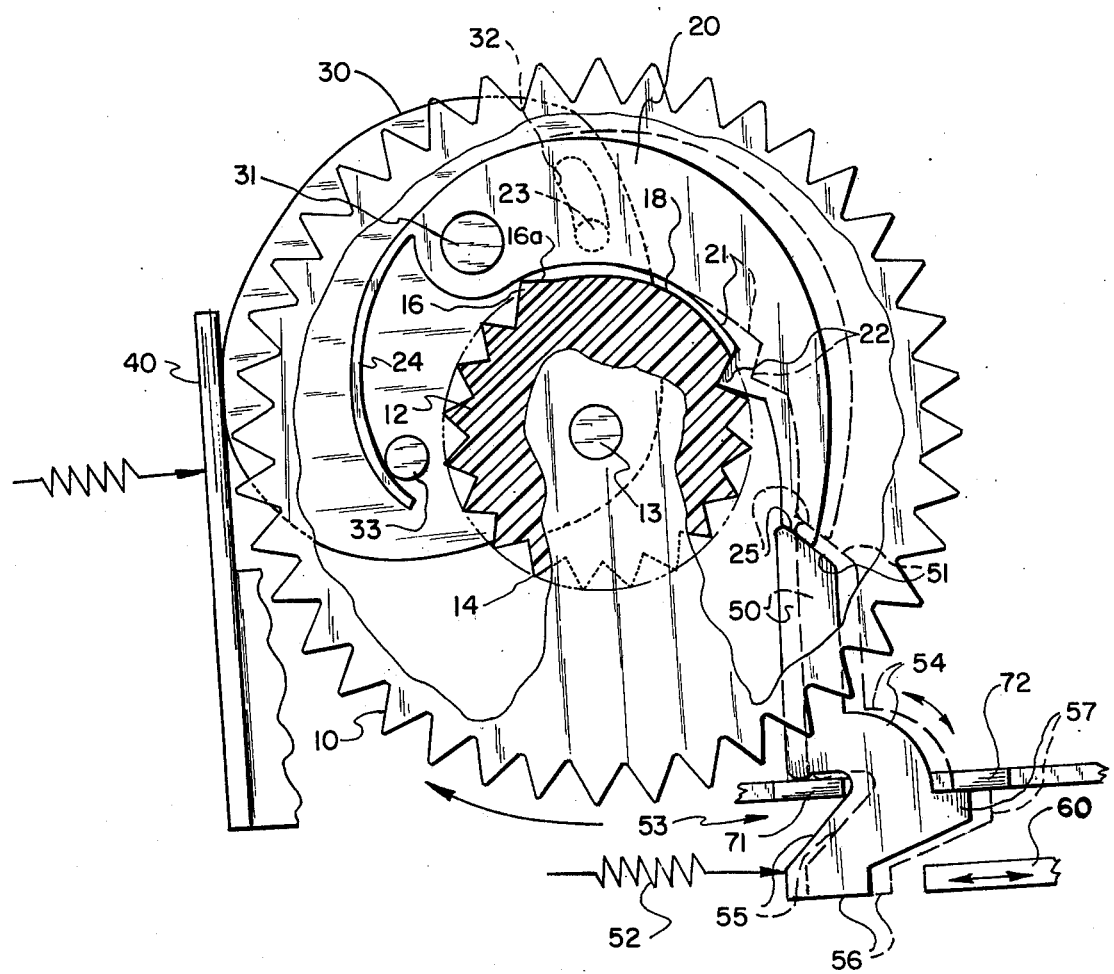

PAWL AND RATCHET CLUTCH

BACKGROUND OF THE INVENTION

The present invention relates generally to improvements to the general class of clutches known as pawl and ratchet clutches. In U.S. Pat. No. 3,810,210 a self-processing camera is described in which upon actuation of the shutter release member a film unit is exposed and a leading edge thereof advanced into the nip of a pair of opposed pressure rollers. The passage of the film unit through the pressure rollers uniformly spreads a developer solution over the image recording portion of the film unit and drives this portion of the film unit from the camera. The patent discloses that to advance the film unit into the nip of the pressure rollers a reciprocable feeder unit may be used which includes a claw-like member that engages the film unit and moves the film unit towards the pressure rollers. The motivating power for the claw is provided by a motor that is coupled to the feeder unit through a pawl and ratchet clutch. The presence of a clutch is desirable since the pressure rollers are directly driven by the motor through suitable gearing and require that drive be provided to them for a time longer than that required to be provided to return the fingers to their initial position. The clutch, therefore, may be uncoupled at an appropriate time in the drive cycle so that continued drive to the pressure rollers can be provided without further disturbing the feeder unit.

As known in the prior art, a pawl and ratchet clutch includes a ratchet wheel that is keyed for example to a rotating input drive and a pawl that is coupled to an output mechanism, such as a gear or cam, for rotation with such mechanism. The pawl is pivotably supported on the output mechanism so that it may pivot into and out of coupling engagement with the ratchet wheel and thereby selectively couple the rotary input drive to the clutch output mechanism. In a self-releasing pawl and ratchet clutch a surface on a clutch release finger may be located to block the path of the pawl when it is rotated with the ratchet wheel and thereby uncouple the pawl from the wheel after a desired period of coupled rotation of the two members. While this type of clutch operates generally satisfactory in a mechanical sense a problem which may occur with such clutches is the generation of noise created by the wiping of the teeth of the rotating ratchet wheel against the uncoupled pawl.

SUMMARY OF THE INVENTION

It is an object of the invention to provide an improvement to a pawl and ratchet clutch which reduces the noise created by such a clutch when the clutch is uncoupled.

Briefly, the foregoing and other objects are accomplished by providing an improved pawl and ratchet clutch wherein the ratchet wheel includes a plurality of similarly sized teeth and means on the ratchet wheel which extend beyond the outer diameter of such teeth, to move the uncoupled pawl away from the similarly sized teeth whereby the uncoupled pawl is held out of contact with the similarly sized teeth of the ratchet wheel as the wheel is rotated relative to the uncoupled pawl.

BRIEF DESCRIPTION OF THE DRAWING

In the detailed description of the preferred embodiment of the invention presented below, reference is made to the accompanying drawing, in which the sole FIGURE is a representation, with portions partially cut away, of an elevational view of an apparatus constructed in accordance with the teachings of the invention.

DESCRIPTION OF THE PREFERRED EMBODIMENT

With reference now to the drawing a driven gear 10 is shown which may, for example, form a part of a gear train that exists between a pressure roller on a self-processing camera and a drive source such as a motor or a hand-crank. Such a drive may be noted in the aforementioned U.S. patent as well as in U.S. Application Ser. No. 662,307 filed Mar. 1, 1976, in the name of Clifford G. Vroom. For illustrative purposes, the gear is shown (see arrow) being driven in the clockwise direction about an axle 13. A part of the central portion of gear 10 is cut away to illustrate the structure of the improved clutch of the invention. A ratchet wheel 12 is concentric with and keyed for rotation with gear 10 about axle 13. Preferably, the gear and clutch parts are made of a suitable plastic and the ratchet wheel 12 is integrally molded to the inside face of gear 10 and the two latter elements are free to rotate relative to axle 13. In the preferred embodiment of the ratchet wheel there is provided at the periphery thereof a plurality of evenly spaced, radially directed teeth 14 of similar size and configuration. A circle defined by the tips of these teeth is shown in phantom in the FIGURE. An enlarged tooth 16 is provided on the ratchet wheel and it may be seen to extend through this circle for a small distance preferably on the order of 0.01 inches (0.25mm) for a 0.5 inches (13mm) diameter ratchet wheel. Adjacent the tooth on the wheel is a toothless segment 18 that extends for approximately four or five tooth widths (inclusive of interdental tooth spaces) and extends uniformly radially outwardly to the imaginary circle heretofore described.

A pawl 20 cooperates with the ratchet wheel 12. The pawl 20 is a generally flat member that includes a generally circularly curved inwardly facing edge 21. The curvature of edge 21 is sufficiently similar to that of a portion of the imaginary circle heretofore described to permit the edge 21 to be juxtaposed about a portion of the wheel when a tooth-like element 22 on the edge 21 of the pawl, intermediate the ends thereof, seats within an interdental space on the wheel. When coupled with the ratchet wheel, the pawl 20 couples the ratchet wheel drive to a cam 30 to which the pawl is pivotably mounted. The cam 30 is also supported for rotation about stationary axle 13 so that when pawl 20 is uncoupled from ratchet wheel 12 the ratchet wheel may continue to rotate and no drive will be furnished to the cam 30. Sufficient friction is preferably provided for between cam 30 and stationary axle 13 to eliminate coasting of the cam after uncoupling of the pawl from the ratchet wheel. The mounting of the pawl to the cam may be accomplished by providing, at about one end of the pawl, a hole through which extends a pin 31 that is fixed to cam 30. There is also formed on this end of the pawl a curved tail 24 that is sufficiently thin so as to be resilient. The tail 24 at a point adjacent the end thereof bears against a post 33 that is fixed to the cam 30. The post 33 lies between the ratchet wheel and the tail 24. The locations of pins 31, 33 and engagement point of the ratchet wheel and pawl are such as to place the tail under stress so that the pawl is always biased by the tail 24 towards coupling engagement with the ratchet wheel. A pin 23 is fixed to and extends rearwardly from the innerside of the pawl and is located within a curved slot 32 formed in cam 30. The slot 32 permits normal pivoting movement of the pawl about the pin 31 (which movement will be further described below) but precludes pivoting of the pawl to an extent that would cause tail 24 to break or bend beyond its elastic limit.

In its initial uncoupled mode (shown in phantom) the pawl 20 is held away from the ratchet wheel 12 by a clutch release finger 50. A generally radially directed ramp-like end 51 of this finger faces and engages an oppositely facing beveled end 25 of the pawl. When used in the context of a self-processing camera, the clutch may be engaged by the leftward advancement of a shutter release member 60 against leg 56 of the clutch release finger 50 to pivot the latter clockwise about a pivotable connection 53 which couples the clutch release finger to the permanently stationary frame of the camera. The clockwise movement of the finger 50 and the bias imposed by the tail 24 frees the pawl to move into engagement with any tooth on the now stationary ratchet wheel that happens to be in position to be engaged. The return of the shutter release member 60 to its rightwardmost position permits spring 52, which is coupled to the clutch release finger and the frame of the camera, to attempt to pivot the clutch release finger back to its previous position (shown in phantom). The movement of the pawl into engagement with the ratchet wheel however places the beveled end 25 of the pawl to the left of the end 51 of the clutch release finger and therefore, the finger will be blocked from pivoting counterclockwise to its home position (shown in phantom) during the portion of a cycle in which pawl 20 is between the finger 50 and the ratchet wheel.

With the commencement of drive to the gear 10, drive will be transferred from the ratchet wheel 12 to the pawl 20 which in turn will cause cam 30 to rotate with the axle 13. A cam follower member 40 may be associated with cam 30. The follower 40 may be part of the reciprocable feeder unit that is used to advance the film units into the nip of the camera's pressure rollers as heretofore described and as more fully described in U.S. Pat. No. 3,810,210 and in the aforementioned U.S. Pat. Application Ser. No. 662,307.

It is totally random as to which interdental tooth space on the ratchet wheel will be in position to be entered by pawl tooth 22 when the clutch release finger 50 releases the pawl. It is advantageous, however, that the pawl tooth 22 not be permitted to couple with the ratchet wheel at locations on the ratchet wheel in which the enlarged tooth 16 would be spaced from the pawl pivot pin 31 a distance sufficient to press against edge 21 with a moment arm large enough to force the pawl out of coupled engagement with the wheel prior to the pawl's completing a full revolution. The toothless segment 18 precludes coupling of the pawl with the wheel at such locations. This segment is located adjacent the enlarged tooth in the direction of coupled rotation of the pawl and ratchet wheel.

It is preferred that the pawl be sufficiently flexible and the teeth of the pawl and ratchet wheel be shaped appropriately to permit the pawl to snap out of engagement with the driven ratchet wheel in a situation in which the clutch is operating under loads greater than that which are desirable. The automatic release of the pawl from the wheel under extraordinary loads will avoid creating an excessive torque buildup in the input drive and/or the output drive that could be sufficiently large as to cause the permanent deformation of, for example, the teeth on gear 10 or the feeder unit. It will be appreciated from the FIGURE that the pawl can be driven by enlarged tooth 16 when the pawl tooth 22 is engaged by tooth surface 16a. Since this surface 16a only exists between the outer diameter of the toothless segment 18 and the tip of tooth 16 it is surprising that there can be a coupling of this surface with pawl tooth 22 which will be as good as or even stronger than that which may be achieved between the pawl and the other teeth. It is believed that the extra radial distance of tooth 16 from the center of the ratchet wheel creates an angular relationship between the pawl tooth 22 and the engaged ratchet wheel tooth 16 which provides an inherent increased resistance towards uncoupling of the clutch under higher loads. Since it is preferred to have the clutch automatically disengage at a load substantially below that at which damage to the gears or feeder unit could occur, the driving surface 16a of the enlarged tooth is advantageously substantially shorter than a corresponding surface of a normal sized tooth to offset the inherent effects discussed above. In one sense the length of surface 16a is determined by the radial outward extent of toothless segment 18. That is, the further the segment extends radially, the shorter will be the length of driving surface 16a (other things being equal). To provide for general uniformity in load carrying ability of the ratchet wheel teeth, it has been found advantageous to have the toothless segment 18 extend out to the outer diameter of the normal sized teeth 14 of the ratchet wheel. It will also be noted that the slope of the driving tooth surface 16a is less acute (relative to a respective tangent to the illustrated imaginary circle) than that of the other teeth. This gentler slope also facilitates clutch disengagement under extraordinary loads.

After one revolution of the coupled clutch members the pawl becomes trapped by the clutch release finger 50. As indicated previously finger 50 is supported by a pivotable connection 53. This connection comprises laterally spaced stationary elements 71 and 72 which may for example be a part of the frame of a camera. Between the elements 71 and 72 there is located the body portion from which finger 50 extends. This body portion is comprised of a rounded shoulder 54 and a concave portion 55 which faces oppositely away from the shoulder. Depending from the body portion are legs 56 and 57, the former extending in a direction opposite to that of the finger and the latter extending in a direction generally perpendicular to the former. Leg 57 cooperates with the underside of element 72 so that the element 72 comprises a limit stop as to the counterclockwise pivoting of the finger. The rounded shoulder 54 and concave portion 55 permit the clockwise pivoting of the finger 50 when struck by the leftward movement of the shutter release member 60. An interesting feature of this pivotable connection 53 is that it is not only less expensive to assemble than that of a pin-type pivot connection but it also has further advantages which will now be described.

As may be noted from the FIGURE, the elements 71 and 72 are spaced sufficiently apart to permit not only pivotable movement of the finger 50 in the directions indicated by the arrows adjacent the shoulder 54 but also translational movement of the finger between a first position (shown in phantom) located adjacent element 72 and a second position (shown in full lines) located adjacent element 71 wherein the finger is positioned closer to the wheel. The momentum of the coupled pawl and ratchet wheel when the pawl first meets the finger 50 forces the finger to translate from the first position towards the second position where the finger remains during the uncoupling of the pawl tooth 22 from its interdental seat on the ratchet wheel. The continued drive of the wheel forces the blocked pawl from its interdental seat on the wheel. After the pawl tooth 22 is forced from its seat on the wheel and becomes uncoupled with the wheel, the spring 52 restores the finger from its second position to its first position and in doing so moves the pawl away from the wheel. As further rotation of the ratchet wheel occurs, the enlarged tooth 16 will strike against pawl tooth 22 and cause the pawl to be moved further away from the wheel and the pawl end surface 25 will be moved further radially outwardly along generally radially directed ramp 51. In such position (shown in phantom) the pawl 20 will be held so that the pawl tooth 22 is out of contact with the tips of the similarly sized teeth of the rotating ratchet wheel.

Thus it will be appreciated that a simple, inexpensive and reliable ratchet and pawl clutch has been described that reduces the noise created by the striking of the pawl by the tips of each of the ratchet teeth when the pawl is uncoupled from the wheel. Although the tip of the single enlarged tooth may wipe against the uncoupled pawl once for each revolution of the wheel, the noise created by such wiping has been found to be substantially more tolerable than that produced when the pawl clicks against each and every ratchet wheel tooth.

The invention has been described in detail with particular reference to a preferred embodiment thereof, but it will be understood that variations and modifications can be effected within the spirit and scope of the invention.

We claim:

1. An improved pawl and ratchet clutch, comprising a pawl, a rotatable ratchet wheel including a plurality of generally similarly sized teeth adapted to engage the pawl and rotate with the pawl in coupled engagement, pawl releasing means locatable in the path of the pawl when it is coupled with the wheel to uncouple the pawl from coupled engagement with the wheel, and the improvement which comprises:
   means on the ratchet wheel and extending further radially outwardly beyond the radial extent of the generally similarly sized teeth for moving the uncoupled pawl away from the wheel; whereby the pawl releasing means holds the uncoupled pawl out of contact with the generally similarly sized teeth of the ratchet wheel as the wheel is rotated relative to the uncoupled pawl.

2. The invention according to claim 1 wherein the pawl releasing means includes:
   a finger locatable in a first position so that the finger is spaced from the wheel and in the path of the rotating pawl to stop the pawl from further rotation with the wheel and hold the uncoupled pawl out of coupled engagement with the wheel;
   means supporting the finger for movement between said first position and a second position that is closer to the wheel; and
   spring means for biasing the finger towards the first position whereby the finger moves and is held in the second position when stopping the pawl and is restored by the spring means to the first position when the pawl is uncoupled from the wheel to thereby hold the pawl out of contact with the generally similaly sized teeth after the pawl has been moved away from the wheel by the pawl moving means on the wheel.

3. The invention according to claim 1 wherein the pawl moving means comprises an enlarged tooth formed on the wheel, the enlarged tooth extending further radially outwardly beyond the radial extent of the generally similarly sized teeth.

4. The invention according to claim 3 wherein a toothless segment is located on the periphery of the ratchet wheel adjacent to the enlarged tooth, the toothless segment being located towards the side of the enlarged tooth identified by the direction of coupled rotation of the pawl and ratchet wheel.

5. The invention according to claim 4 wherein the pawl releasing means further includes:
   a finger locatable in a first position so that the finger is spaced from the wheel and in the path of the rotating pawl to stop the pawl from further rotation with the wheel and hold the uncoupled pawl out of coupled engagement with the wheel;
   means supporting the finger for movement between said first position and a second position that is closer to the wheel; and
   spring means for biasing the finger towards the first position whereby the finger moves and is held in the second position when stopping the pawl and is restored by the spring means to the first position when the pawl is uncoupled from the wheel to thereby hold the pawl out of contact with the generally similarly sized teeth after the pawl has been moved away from the wheel by the enlarged tooth.

6. The invention according to claim 3 wherein the pawl releasing means further includes:
   a finger locatable in a first position so that the finger is spaced from the wheel and in the path of the rotating pawl to stop the pawl from further rotation with the wheel and hold the uncoupled pawl out of coupled engagement with the wheel;
   means supporting the finger for movement between said first position and a second position that is closer to the wheel; and
   spring means for biasing the finger towards the first position whereby the finger moves and is held in the second position when stopping the pawl and is restored by the spring means to the first position when the pawl is uncoupled from the wheel to thereby hold the pawl out of contact with the generally similarly sized teeth after the pawl has been moved away from the wheel by the enlarged tooth.

7. An improved pawl and ratchet clutch comprising a ratchet wheel having a plurality of radially directed teeth of generally similar size and configuration provided about the periphery of the wheel with an interdental space formed between adjacent teeth, a pawl having a curvature generally similar to that of a portion of the periphery of the wheel, the pawl being juxtaposed with a portion of the periphery of the wheel and the pawl including a tooth that is locatable within an interdental space to couple the pawl to the wheel for coupled rotation of the pawl and wheel in a predetermined rotational direction, clutch output means rotatable with the pawl for pivotably supporting the pawl at a point spaced from the pawl tooth for permitting pivotable movement of the pawl tooth into and out of coupled engagement with the wheel, spring means for biasing the pawl tooth towards coupled engagement with the wheel, pawl releasing means locatable in the path of the pawl when it is coupled with the wheel to uncouple the pawl from coupled engagement with the wheel and hold the uncoupled pawl out of coupled engagement with the wheel, and the improvement which comprises:

- an enlarged tooth formed on the periphery of the wheel, the enlarged tooth extending radially outwardly to an extent greater than that of any of the plurality of generally similarly sized teeth for moving the uncoupled pawl tooth away from the wheel; and
- wherein the pawl releasing means includes means cooperable with the pawl for holding the uncoupled pawl out of contact with the plurality of generally similarly sized teeth after the pawl tooth has been moved away from the wheel by the enlarged tooth.

8. The invention according to claim 7 wherein the pawl releasing means includes:

- a finger locatable in a first position so that the finger is spaced from the wheel and in the path of the rotating pawl to stop the pawl from further rotation with the wheel and hold the uncoupled pawl out of coupled engagement with the wheel;
- means supporting the finger for movement between said first position and a second position that is closer to the wheel; and
- second spring means for biasing the finger towards the first position whereby the finger moves and is held in the second position when stopping the pawl and is restored by the second spring means to the first position when the pawl is uncoupled from the wheel to thereby hold the pawl tooth out of contact with the generally similarly sized teeth after the pawl has been moved away from the wheel by the enlarged tooth.

9. The invention according to claim 7 wherein the ratchet wheel further includes a toothless segment formed on the periphery of the wheel adjacent the enlarged tooth, the toothless segment being located towards the side of the tooth identified by the direction of coupled rotation of the pawl and ratchet wheel, the toothless segment extending circumferentially for a distance of at least the equivalent of several wheel tooth widths.

10. The invention according to claim 9 wherein the pawl releasing means includes:

- a finger locatable in a first position so that the finger is spaced from the wheel and in the path of the rotating pawl to stop the pawl from further rotation with the wheel and to hold the uncoupled pawl tooth out of contact with the generally similarly sized teeth;
- means supporting the finger for movement between said first position and a second position that is closer to the wheel; and
- second spring means for biasing the finger towards the first position whereby the finger moves and is held in the second position when stopping the pawl and is restored by the second spring means to the first position when the pawl is uncoupled from the wheel to thereby hold the pawl tooth out of contact with the generally similarly sized teeth after the pawl has been moved away from the wheel by the enlarged tooth.

11. The invention according to claim 10 wherein a pawl driving surface of the enlarged tooth of the wheel is located between the toothless segment and the radially outward extent of the enlarged tooth and is substantially shorter than a respective driving surface of each of the wheel's similarly sized teeth.

12. The invention according to claim 11 wherein the spring means for biasing the pawl towards engagement with the wheel includes a resilient tail-like member extending from the pawl, and the clutch output means includes means cooperable with the tail to bias the pawl towards coupled engagement with the wheel.

* * * * *